UNITED STATES PATENT OFFICE.

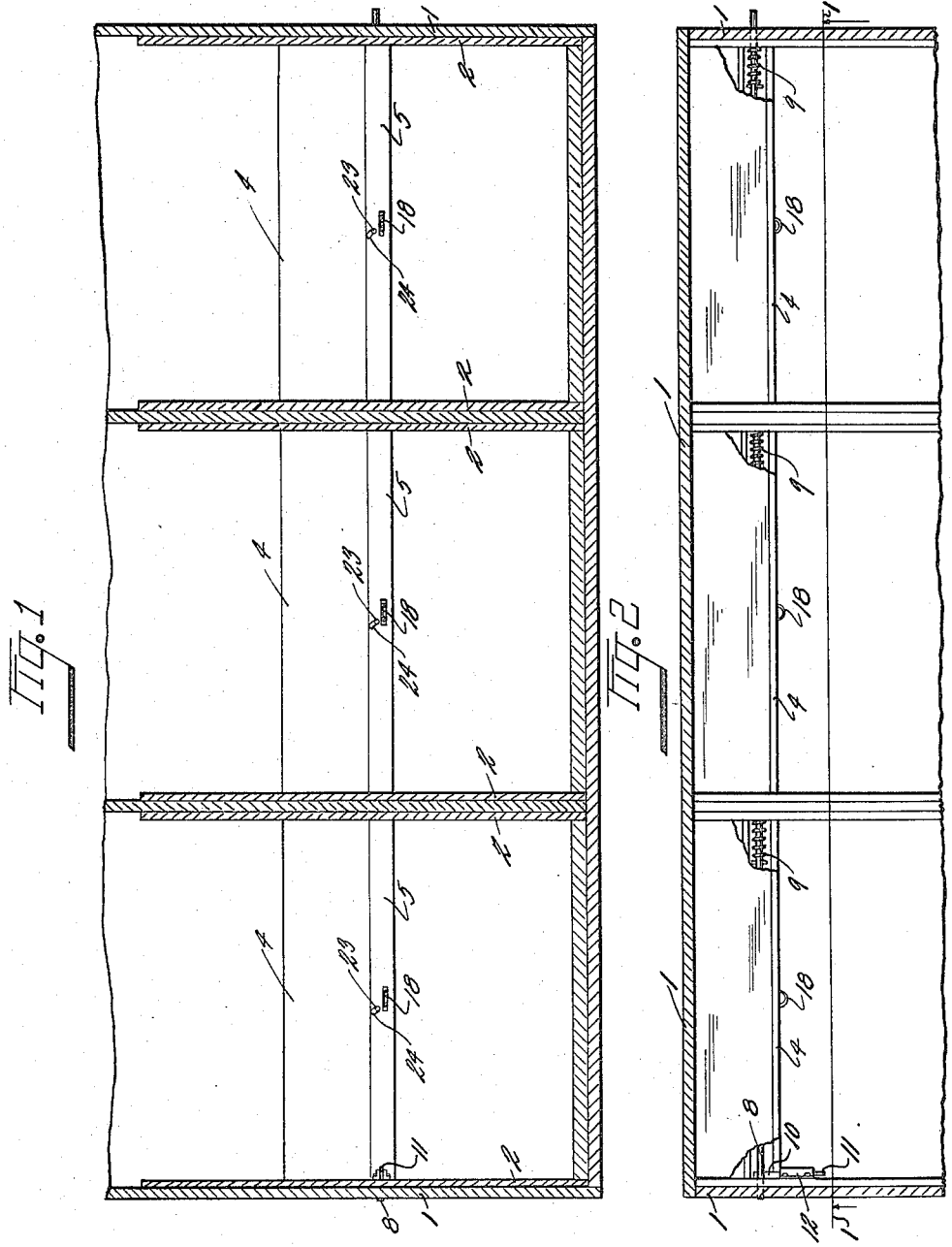

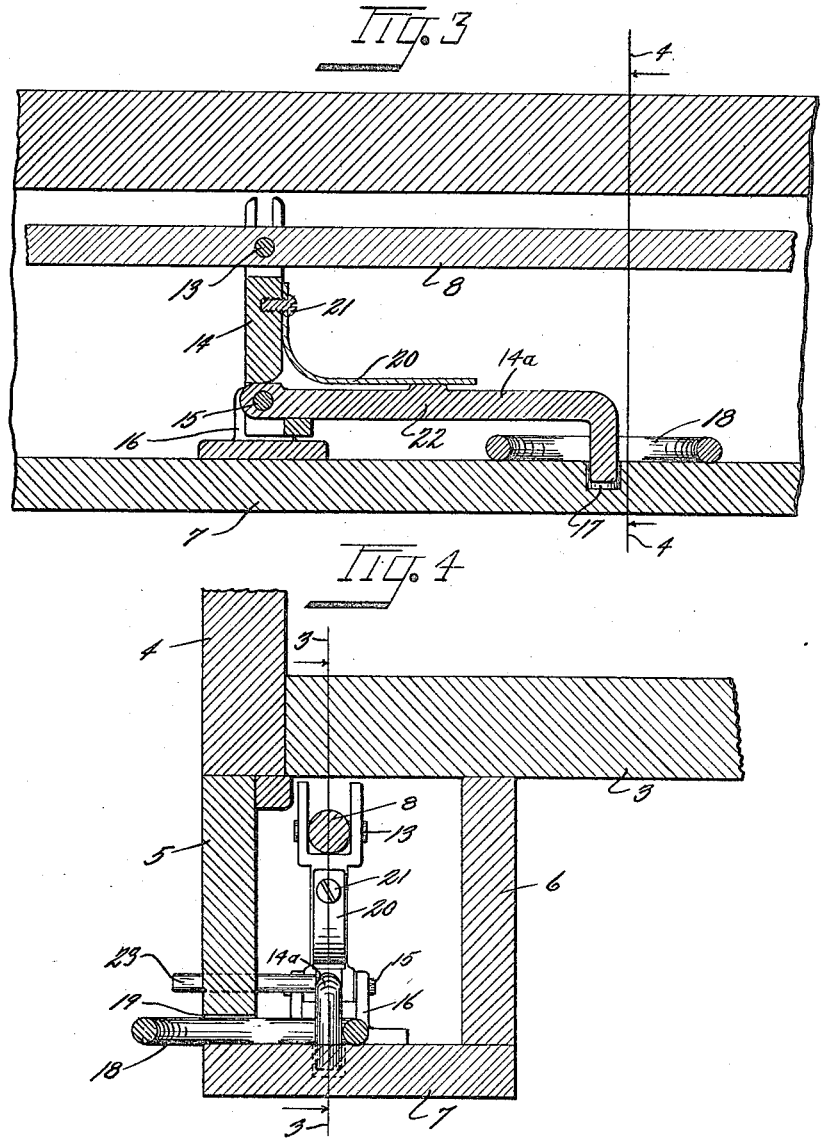

FRED SUNDVIK AND CARL JOHANSSON, OF ST. PAUL, MINNESOTA.

ANIMAL-RELEASING DEVICE.

1,165,727.　　　　Specification of Letters Patent.　　Patented Dec. 28, 1915.

Application filed February 11, 1915.　Serial No. 7,589.

*To all whom it may concern:*

Be it known that we, FRED SUNDVIK and CARL JOHANSSON, citizens of the United States, and residents of St. Paul, in the county of Ramsey and State of Minnesota, have invented certain new and useful Improvements in Animal-Releasing Devices, of which the following is a specification.

This invention relates to improvements in animal releasing devices and its object is to produce means for automatically releasing a number of animals from a series of stalls in a stable simultaneously should necessity require.

With the foregoing and other objects in view the invention consists in the combination and arrangement of parts to be hereinafter fully described in the following specification, pointed out in the claims and illustrated in the accompanying drawings which form a part of said specification and in which—

Figure 1 is a longitudinal sectional view through a series of stalls provided with our improved mechanism and it is taken on line 1—1 of Fig. 2. Fig. 2 is a plan view of the same. Fig. 3 is a section taken on line 3—3 of Fig. 4. Fig. 4 is a cross section taken on line 4—4 of Fig. 3.

Like reference characters indicate corresponding parts throughout the several views.

The reference numeral 1 designates a stable or other building provided with partitions 2 that divide it into a series of stalls. To the underside 3 of the manger and to the wall 4 thereof a housing is secured which consists of the longitudinally extending parallel walls 5, 6 connected by the base 7. Throughout the stable and through the several partitions of the same and through the housing aforesaid a pull rod 8 extends which is provided in each stall with a spring 9 which abuts one of the partitions 2 and exerts a pressure upon the pull rod which rod is normally retained in adjusted position by means of a suitable catch 10 provided with a handle 11 and journaled in a housing 12 secured to one end stall in the stable; said catch being releasable from the rod to permit movement of the same longitudinally by the action of the said springs 9 when desired.

The pull rod 8 is provided, in each stall, with a pin 13 which extends through the end of a casting 14 fulcrumed upon a pin 15 journaled in a bracket 16 secured to the base 7 of the housing. An angular arm 14$^a$ also pivoted upon the pin 15 extends at right angles to the casting 14 and has its down turned end normally projected into a recessed portion 17 of the base 7 whereby the hitching ring 18 is retained in fixed relation with said base, a portion of said ring projecting through a slot 19 in the wall 5 of the housing to receive the halter strap of the animal. A flat spring 20 fastened as at 21 to the casting 14 bears upon the arm 14$^a$ to normally retain the same in operative relation. The said arm 14$^a$ is recessed as at 22 to permit its engagement by the lift pin 23 which extends through an elongated aperture 24 in the wall 5 and into said recess 22 and by means of said lift pin 23 any individual arm 14$^a$ in any stall of the series may be raised to release an individual hitching ring and so free a particular animal. It is obvious that the longitudinal movement of the pull rod effected by the several springs 9 when the catch 10 is disconnected from the said rod will tilt the several castings 14 which in turn will move the arms 14$^a$ upon their pivots and raise them out of engagement with the base 7 releasing all of the hitching rings simultaneously. To re-set the device it is but necessary to manually force the pull rod back against the tension of the springs 9 and again apply the catch 10.

What is claimed is:—

1. The combination with a partitioned housing having recesses in its base and apertures in one of its side walls, of a continuous pull rod, pressure springs connecting said rod and the partitions of said housing, a catch for retaining said rod in adjusted position against the tension of said springs, pivotally supported castings arranged within said housing and operatively connected to said pull rod, angular arms arranged upon the pivots of said castings and having the free ends thereof normally disposed in the recessed portions of the base of said housing, hitching rings operatively associated with the angular ends of said arms, means connecting said castings and arms for normally retaining the latter members in operative relation and release handles carried by said arms and projected through the apertured portions of the side wall of said housing whereby said arms may be raised out of engagement with the base of said housing to release the hitching rings.

2. The combination with a partitioned housing having recesses in its base and apertures in one of its side walls, of a continuous spring-pressed pull rod, a catch for said pull rod, pivotally mounted arms having their free ends normally disposed in the recessed portions of the base of said housing, hitching rings normally in engagement with said arms, castings arranged upon the pivots of said arms and operatively associated with said pull rod and with said arms to release said hitching rings simultaneously, springs connecting said castings and arms whereby the latter members are normally retained in operative relation and manually operable lift means for said arms projected through the apertured portions of the side wall of said housing whereby the hitching rings may be released individually.

In testimony that we claim the foregoing as our own we have hereto affixed our signatures in the presence of two subscribing witnesses.

FRED SUNDVIK.
CARL JOHANSSON.

Witnesses:
E. S. WILLEY,
ALBERT SUNDVIK.

Copies of this patent may be obtained for five cents each, by addressing the "Commissioner of Patents, Washington, D. C."